June 16, 1925.　　　　　F. S. LYMAN　　　　　1,542,155
SEED SEPARATOR
Filed June 15, 1923　　　2 Sheets-Sheet 2
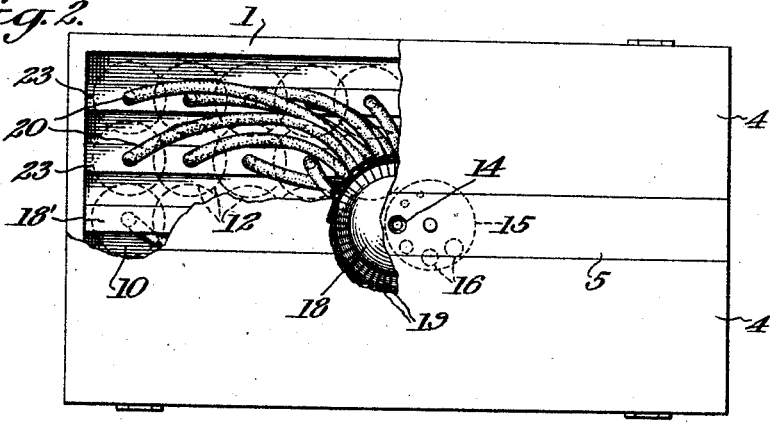
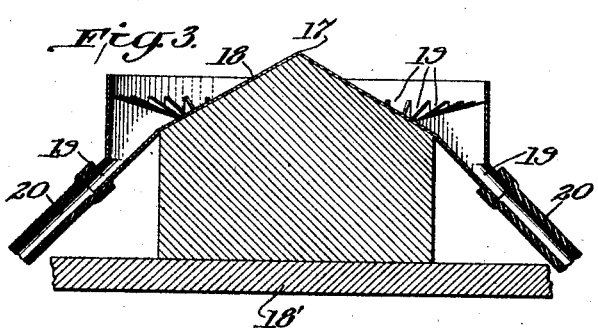
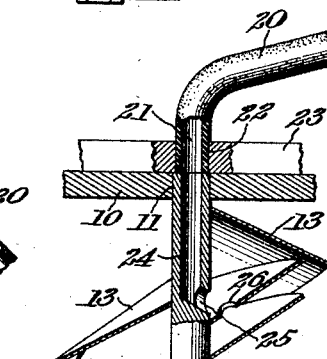
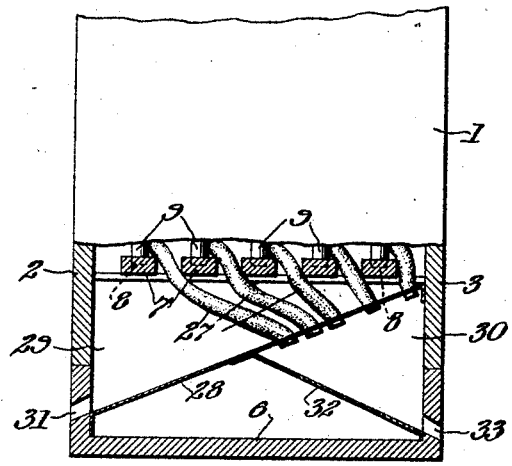
Inventor:
Frederic S. Lyman
By
Attorney.

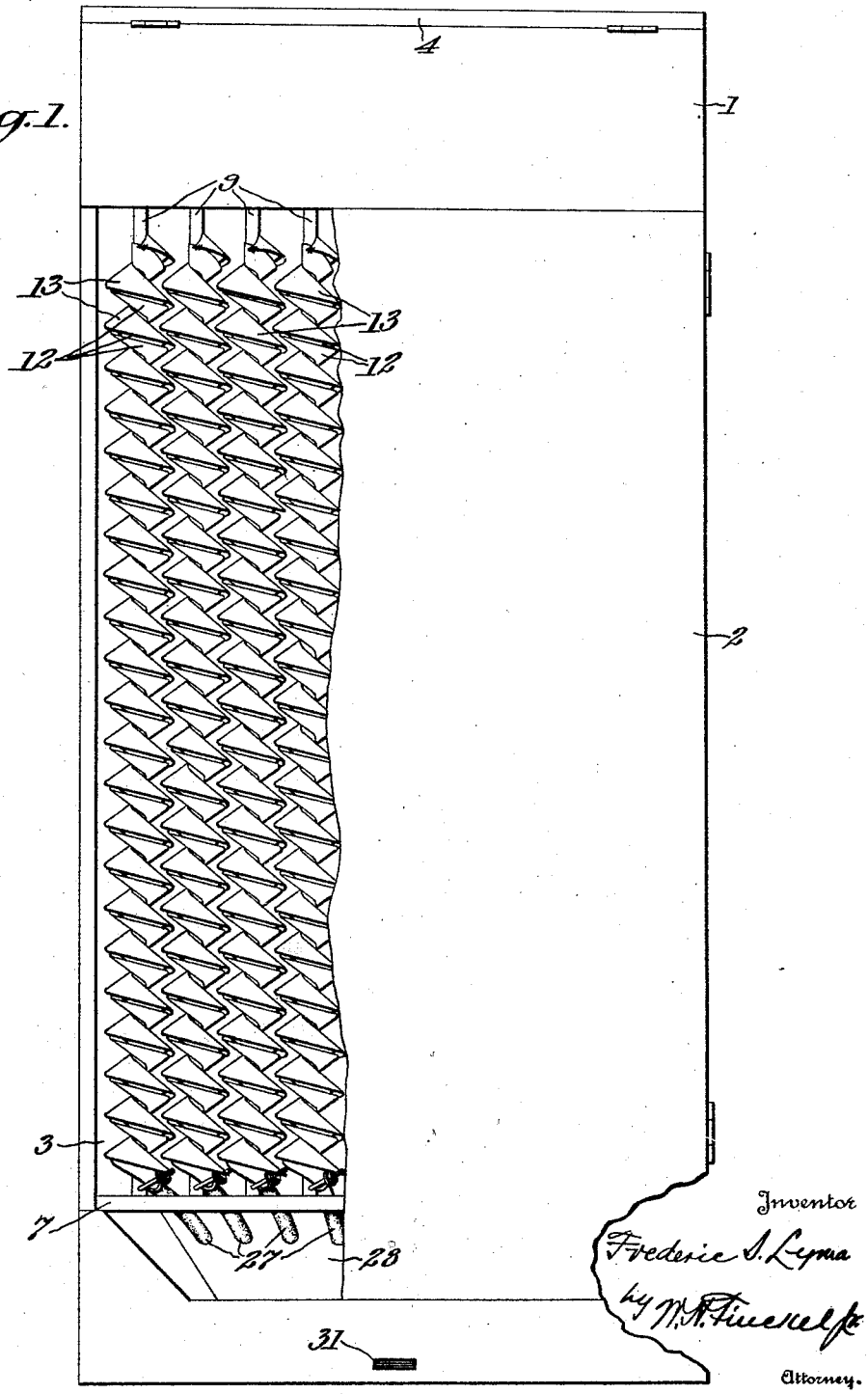

Patented June 16, 1925.

1,542,155

UNITED STATES PATENT OFFICE.

FREDERIC S. LYMAN, OF SALT LAKE CITY, UTAH, ASSIGNOR OF ONE-HALF TO MAURICE KEATING, OF SALT LAKE CITY, UTAH.

SEED SEPARATOR.

Application filed June 15, 1923. Serial No. 645,647.

*To all whom it may concern:*

Be it known that I, FREDERIC S. LYMAN, a citizen of the United States, residing at Salt Lake City, in the county of Salt Lake and State of Utah, have invented a certain new and useful Improvement in Seed Separators, of which the following is a full, clear, and exact description.

The object of this invention is to provide a device for separating various kinds of seeds, grain and the like from each other in a rapid, certain and economical manner.

The device is designed particularly for separating seeds of different specific gravity; or seeds differing in shape, such as substantially flat seeds and substantially spherical seeds, in which latter classes fall alfalfa seed and dodder seed respectively.

I am aware that machines operating upon a principle somewhat similar to mine have been devised heretofore, as shown by the patent of Alexsander Boguszewski, No. 627,970, dated July 4, 1899, but my machine embodies advantages thereover in that once the different kinds of seeds are separated there is no chance for subsequent commingling of them during their passage through the machine, whereby efficient separation and subsequent complete isolation of one variety of seed from another is accomplished and a standard marketable product obtained.

Moreover my machine embodies a seed feeding arrangement whereby maximum efficiency of the separating devices is attained.

The invention consists in a seed separator comprising a casing, a distributor associated therewith, a plurality of spiral raceways supported vertically in the casing and provided with covers of complemental spiral formation for preventing communication between successive convolutions of the same raceway and with adjacent raceways, and a divided compartment in the bottom of the casing, one division thereof communicating with the interior of the casing, and means furnishing discharges from said raceways into the other division of said compartment, as I will proceed now to explain and finally claim.

In the accompanying drawings illustrating the invention, in the several figures of which like parts are similarly designated, Figure 1 is a front view of the device with a portion of the front closure broken away to show some of the spiral raceways. Fig. 2 is a top view of same with a portion of the top closure broken away to show the distributor and tubes communicating with the raceways. Fig. 3 is an enlarged vertical central section of the distributor. Fig. 4 is a fragmentary sectional elevation of one side of the device showing the divided bottom compartment. Fig. 5 is an enlarged fragmentary sectional elevation of one of the spiral raceways and its support.

Referring more particularly to the drawings, 1 indicates a box-like casing having hinged doors 2 and 3 at front and back respectively and hinged cover-portions 4 forming, in conjunction with a cross-member 5 a complete closure for the top of the casing 1.

Spaced at a suitable distance from the bottom 6 of the casing is a plurality of bars 7 having sockets 8 in which are stepped the supports 9 for the spiral raceways, later described, these supports being held in vertical position by a partition 10 arranged near the top of the casing and provided with openings 11 to receive the upper ends of the supports.

The separation of the seeds is accomplished, as hereinabove indicated, by the spiral raceways 12, which comprise strips or plates of material, preferably sheet-metal, bent to spiral form and wound, preferably in pairs, in descending convolutions around the supports 9. Above each pair of raceways 12 is arranged a cover 13 also of spiral form and following the convolutions of the raceways 12. These covers are of somewhat greater diameter than the raceways and are spaced a small distance above the upper edge of the upper member of the pair of spirals of the raceways.

Seeds are fed into the machine by any suitable means through an opening 14 in the cross-member 5 and beneath this opening is mounted a rotatable disk 15 provided with a series of apertures 16 graduated in size and adapted to register with the opening 14 for the purpose of controlling the flow of seed.

Arranged below the opening 14 and having its apex 17 in direct axial alignment therewith is a cone-shaped distributor 18 supported upon a cross-piece 18' above the partition 10 and provided with a plurality of outlets 19 corresponding in number with the number of spiral raceways, and each outlet is provided with a conductor member 20, in the form shown a section of tubing, which conducts the seed running to each outlet to its respective raceway.

The discharge end 21 of each tube is fitted into an opening 22 in a batten 23 in axial alignment with the support 9 of its respective raceway 12 and, as shown in Fig. 5, each support is provided at its upper end with a bore 24 intercepted by an opening 25 which affords an outlet for the seed to the upper spiral of the raceway. As the seed falls upon this spiral a portion of it falls through an opening 26 therein and upon the lower spiral.

The pitch of the spiral is such as to cause the seed to flow down it, and the rate of flow is so proportioned, by means of the apertures 16 in disk 15, that the seed will flow approximately in single file. In the case of separation of dodder from alfalfa seed, the dodder, being substantially spherical, will obtain sufficient momentum as it follows the course of the raceway, to cause it to be thrown out of the raceway into the interior space of the casing, whereas the alfalfa seed, being substantially flat, will slide down the raceway to the discharge end thereof.

When the dodder is thrown out of the raceways it cannot reenter them because of the covers 13 and hence, when once separated from the alfalfa seed, it cannot again become mixed therewith.

In the case of separation of seeds of substantially similar shape but of different specific gravity the heavier seeds will be ejected from the raceway while the lighter seeds will be retained therein.

At its discharge and the upper spiral of each raceway communicates with the lower spiral thereof, (see Fig. 5) and it in turn communicates with a tube or discharge means 27.

The casing 1 below the bars 7 forms a seed receiving compartment and is divided by a partition 28. One division 29 of this compartment communicates with the interior of the casing and receives the seed (dodder in the example used above) which is ejected from the raceway by centrifugal force. The tubes 27 discharge into the other division 30 of the compartment. The partition 28 forms a slanting bottom for division 29 and this division communicates with and discharges through an opening 31. A slanting bottom 32 is provided for division 30 and it discharges through an opening 33. Suitable receptacles, such as boxes or bags may be so positioned as to catch the seeds discharged through openings 31 and 33.

It will thus be seen that I provide a machine of simple, compact and durable construction, well suited to the purpose for which it is intended, and it is to be noted that, owing to the arrangement of the raceways and their covers a great many of them may be nested in a relatively small casing without in any way interfering with their operation, thus making the machine of relatively small size but great efficiency. As an illustration of this I may say that a machine of the type and size shown, having fifty raceways of two spirals each, will separate between nine thousand and ten thousand pounds of seed per day.

I have hereinabove referred to the separation of dodder from alfalfa seed, but it is to be understood that the machine is equally well adapted for use in separating various other seeds so long as the varieties to be separated possess the required relative differences in specific gravity or conformation to cause them to be subject to the separating influence of the spiral raceways, as hereinabove pointed out.

Various changes in construction and arrangement of parts are contemplated as within the spirit of the invention and the scope of the following claims.

What I claim is:—

1. In a seed separator, a casing, a plurality of spiral raceways arranged in said casing, said raceways adapted to receive seeds and to retain those having predetermined properties and to eject those having other properties, said raceways each comprising a pair of superposed spirals, and a cover for each of said raceways following same throughout its convolutions and spaced therefrom to permit discharge of seeds from the spirals between it and their peripheral edges and adapted to prevent entrance into a raceway of seeds ejected therefrom or from other adjacent raceways.

2. In a seed separator, a seed-separating raceway comprising a pair of plates wound spirally around a support, each of said spiral plates adapted to receive seeds to be separated and to retain such of said seeds as possess predetermined properties and to eject others having other properties, and a spiral cover for said raceway following the convolutions thereof but spaced therefrom and adapted to prevent the reentrance into either of the spirals of said raceway of seed once ejected therefrom.

3. In a seed separator, a seed-separating raceway comprising a pair of plates wound spirally around a support, each of said spiral plates adapted to receive seeds to be separated and to retain such of said seeds as possess predetermined properties and to eject others having other properties, and a spiral cover for said raceway following the convolutions thereof but spaced therefrom and having an overhang extending beyond the peripheral edges of the spirals adapted to prevent the reentrance into either of the spirals of said raceway of seeds once ejected therefrom.

4. In a seed separator, a seed-separating raceway comprising a pair of similar superposed spirals, means for feeding seeds to the upper of said spirals, and an opening in said upper spiral through which a portion of the seeds fed thereto will escape to the other spiral.

5. In a seed separator, a seed-separating raceway comprising a pair of superposed spirals adapted to retain seeds of certain characteristics and to eject seeds of other characteristics, a seed inlet communicating with the upper spiral of said pair of spirals, means for diverting a portion of the seeds to the lower of said spirals, and a common outlet for the seeds retained by both of said spirals.

6. In a seed separator, a seed-separating raceway comprising a pair of superposed spirals adapted to retain seeds of certain characteristics and to eject seeds of other characteristics, a seed inlet communicating with the upper spiral or said pair of spirals, means for diverting a portion of the seeds to the lower of said spirals, and a common outlet for the seeds retained by both of said spirals, the upper spiral arranged to discharge into the lower spiral adjacent to said outlet.

In testimony whereof I have hereunto set my hand this 8th day of June 1923.

FREDERIC S. LYMAN.

Witnesses:
MAURICE KEATING,
JUD J. BURGEY.